(12) United States Patent
Oda et al.

(10) Patent No.: US 11,788,928 B2
(45) Date of Patent: Oct. 17, 2023

(54) LIGHT INTENSITY DISTRIBUTION MEASUREMENT METHOD AND LIGHT INTENSITY DISTRIBUTION MEASUREMENT DEVICE

(71) Applicant: NIPPON TELEGRAPH AND TELEPHONE CORPORATION, Tokyo (JP)

(72) Inventors: Tomokazu Oda, Musashino (JP); Yoshifumi Wakisaka, Musashino (JP); Daisuke Iida, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/622,977

(22) PCT Filed: Jul. 11, 2019

(86) PCT No.: PCT/JP2019/027604
§ 371 (c)(1),
(2) Date: Dec. 27, 2021

(87) PCT Pub. No.: WO2021/005800
PCT Pub. Date: Jan. 14, 2021

(65) Prior Publication Data
US 2022/0260454 A1    Aug. 18, 2022

(51) Int. Cl.
*G01M 11/00* (2006.01)
*G01M 11/02* (2006.01)
*H04B 10/073* (2013.01)

(52) U.S. Cl.
CPC ........ *G01M 11/0285* (2013.01); *G01M 11/39* (2013.01); *H04B 10/073* (2013.01)

(58) Field of Classification Search
CPC ............ G01M 11/0285; G01M 11/39; G01M 11/319; G01M 11/0207; G01M 11/02;
(Continued)

(56) References Cited

U.S. PATENT DOCUMENTS

| 7,679,732 B2 * | 3/2010 | Hotate ................... G01M 11/39 |
| | | 356/73.1 |
| 8,493,556 B2 * | 7/2013 | Li ......................... G01K 11/32 |
| | | 356/73.1 |

(Continued)

OTHER PUBLICATIONS

T. Oda et al., "Modal Attenuation Measurement in Spliced Few Mode Fibre Based on Inter-modal Brillouin Gain Analysis", Proc. ECOC, W e2.7 (2018).
(Continued)

*Primary Examiner* — Hoa Q Pham
(74) *Attorney, Agent, or Firm* — Harness, Dickey & Pierce, P.L.C.

(57) ABSTRACT

A light intensity distribution measurement apparatus is presented that is capable of accurately measuring the intensity of light in each mode at each position of an optical fiber through which light is propagated in a plurality of modes. With the light intensity distribution measurement apparatus, a gain coefficient matrix is acquired in advance, which is constituted by Brillouin gain coefficients of propagation modes with predetermined optical frequency differences measured using a reference optical fiber that exhibits the same properties as a measurement-target optical fiber and that does not cause mode coupling, and the intensity distribution of light in each propagation mode in a lengthwise direction of the measurement-target optical fiber is calculated based on the gain coefficient matrix and a difference in light intensity before and after Brillouin amplification of the probe light emitted in a predetermined propagation mode at (Continued)

a predetermined optical frequency difference measured using the measurement-target optical fiber.

4 Claims, 3 Drawing Sheets

(58) Field of Classification Search
CPC ............ G01M 11/083; G01M 11/3172; H04B 10/073; H04B 10/071; G01K 11/322; G01D 5/35364; G01D 5/35358; G01B 11/168; G01B 11/319
USPC .......................................... 356/73.1, 213–218
See application file for complete search history.

(56) References Cited

U.S. PATENT DOCUMENTS

| | | | |
|---|---|---|---|
| 9,784,643 B2* | 10/2017 | Hotate | G01M 11/3181 |
| 11,221,274 B1* | 1/2022 | He | G01H 9/004 |
| 11,402,295 B2* | 8/2022 | Oda | G01M 11/39 |
| 2020/0408636 A1* | 12/2020 | Takahashi | H04J 14/04 |
| 2021/0310897 A1* | 10/2021 | Oda | G01M 11/39 |
| 2021/0396626 A1* | 12/2021 | Okamoto | G01M 11/0207 |
| 2022/0381645 A1* | 12/2022 | Nakamura | G01M 11/39 |

OTHER PUBLICATIONS

H. Takahashi et al., "Individual loss distribution measurement in 32-branched PON using pulsed pump-probe Brillouin analysis", Optics Express, Mar. 25, 2013, 21(6), pp. 6739-6748, (2013).

* cited by examiner

LIGHT INTENSITY DISTRIBUTION MEASUREMENT METHOD AND LIGHT INTENSITY DISTRIBUTION MEASUREMENT DEVICE

CROSS-REFERENCE TO RELATED APPLICATIONS

This application is a 371 U.S. National Phase of International Application No. PCT/JP2019/027604 filed on Jul. 11, 2019. The entire disclosure of the above application is incorporated herein by reference.

TECHNICAL FIELD

The present disclosure relates to a measurement method for accurately measuring the intensity of light that propagates through an optical fiber in each propagation mode, in a lengthwise direction, and a measurement apparatus for measuring the same.

BACKGROUND ART

In recent years, with the rapid increase in transmission traffic, a few-mode fiber (FMF) and a multi-mode fiber (MMF), with which a plurality of propagation modes can be used, have been attracting a lot of attention as fibers that can realize a further increase in capacity, replacing a single-mode fiber (SMF) employed in current transmission lines. In these fibers, differential mode attenuation (DMA), which is an attenuation that varies depending on the mode, and crosstalk (XT), in which some of the modes at the time of input are coupled to a different mode, may occur when light passes through a connection point or a device such as a mode multiplexer/demultiplexer. DMA and XT are important parameters for the receiver to perform signal processing, and therefore it is desirable that the intensity of light in in each mode in the transmission line can be accurately measured for each section. For example, a scheme for acquiring propagation properties for each mode by using a Brillouin gain analysis method has been proposed as a scheme for measuring the intensity of light in each mode in a transmission line for each section (see NPL 1, for example). With this scheme, it is possible to acquire propagation properties for each mode by controlling the frequency difference between pump light and probe light input to a fiber and only generating a specific mode in the fiber.

CITATION LIST

Patent Literature

[PTL 1] Japanese Patent Application Publication No. 2014-20878

Non Patent Literature

[NPL 1] T. Oda et al., Proc. ECOC, W e2.7 (2018).
[NPL 2] H. Takahashi et al., Opt. Express, 21(6), pp. 6739-9748, (2013).

SUMMARY OF THE INVENTION

Technical Problem

However, in the case of a scheme of analysis that employs the Brillouin gain analysis method, the line width of the Brillouin gain is about 20 MHz, and it is difficult to selectively excite a mode unless the respective Brillouin frequency shifts for modes are separated from each other by more than that, even if the frequency difference that maximizes the gain of each mode is used. Furthermore, even when the amount of the gain of a specific mode is large, it is similarly difficult to selectively excite the mode. As described above, the scheme that employs the Brillouin gain analysis method has a problem that it is difficult to improve the measurement accuracy of the intensity distribution for each mode because it is difficult to selectively excite the mode.

Therefore, in order to solve the above problems, the present invention provides a light intensity distribution measurement method and a light intensity distribution measurement apparatus that are capable of accurately measuring the intensity of light in each mode at each position of an optical fiber through which light is propagated in a plurality of modes.

Means for Solving the Problem

To achieve the above-described object, according to a light intensity distribution measurement method according to the present invention, a gain coefficient matrix is acquired in advance, which is constituted by Brillouin gain coefficients of propagation modes with predetermined optical frequency differences measured using a reference optical fiber that exhibits the same properties as a measurement-target optical fiber and that does not cause mode coupling, and the intensity distribution of light in each propagation mode in a lengthwise direction of the measurement-target optical fiber is calculated based on the gain coefficient matrix and a difference in light intensity before and after Brillouin amplification of the probe light emitted in a predetermined propagation mode at a predetermined optical frequency difference measured using the measurement-target optical fiber.

Specifically, a light intensity distribution measurement method according to the present invention is a light intensity distribution measurement method for measuring an intensity distribution of light in a plurality of propagation modes, in a lengthwise direction of a fiber under test, the method including:

preparing a reference optical fiber that has the same number of propagation modes as the fiber under test and that does not cause mode coupling;

inputting pump light and probe light that have a given optical frequency difference, to the reference optical fiber, for each of combinations of the pump light in all of the propagation modes and the probe light in given one mode of the propagation modes;

acquiring a Brillouin gain coefficient generated for the probe light, for each of the combinations of the propagation modes;

acquiring Brillouin gain coefficients respectively corresponding to the propagation modes, while varying the given optical frequency difference for each of the propagation modes;

generating a gain coefficient matrix of the Brillouin gain coefficients for the propagation modes and the optical frequency differences;

inputting pump light and probe light that have the optical frequency difference with which the gain coefficient matrix has been generated, to the fiber under test, for the combinations of the propagation modes;

acquiring Brillouin amplification components generated for the probe light, for each of the optical frequency differences and each of the combinations of the propagation modes, as distribution in a lengthwise direction of the fiber under test; and calculating, based on the distribution, a light intensity of the pump light in each of the propagation modes at a given point of the fiber under test by multiplying a vector of the Brillouin amplification components at the given point of the fiber under test by an inverse matrix of the gain coefficient matrix.

A light intensity distribution measurement apparatus according to the present invention includes:

a light input unit that inputs pump light and probe light that have a given optical frequency difference, to an optical fiber, in all combinations of propagation modes;

a light receiving unit that measures a light intensity of the probe light in given one propagation mode of the propagation modes propagated through the optical fiber; and a control calculation unit that controls the light input unit and calculates light intensity distribution of light in each of the propagation modes in a lengthwise direction of the fiber under test, based on the light intensity measured by the light receiving unit, wherein the control calculation unit:

causes the light input unit to input pump light and probe light that have a given optical frequency difference, to a reference optical fiber that has the same number of propagation modes as the fiber under test and that does not cause mode coupling, for each of combinations of the pump light in all of the propagation modes and the probe light in given one mode of the propagation modes;

acquires a Brillouin gain coefficient generated for the probe light, for each of the combinations of the propagation modes, based on the light intensity measured by the light receiving unit;

causes the light input unit to vary the given optical frequency difference for each of the propagation modes;

acquires Brillouin gain coefficients respectively corresponding to the propagation modes, while varying the given optical frequency difference for each of the propagation modes, based on the light intensity measured by the light receiving unit; and generates a gain coefficient matrix of the Brillouin gain coefficients for the propagation modes and the optical frequency differences, and the control calculation unit further:

causes the light input unit to input pump light and probe light that have the optical frequency difference with which the gain coefficient matrix has been generated, to the fiber under test, for the combinations of the propagation modes;

acquires, based on the light intensity measured by the light receiving unit, Brillouin amplification components generated for the probe light, for each of the optical frequency differences and each of the combinations of the propagation modes, as distribution in a lengthwise direction of the fiber under test; and calculates, based on the distribution, a light intensity of the pump light in each of the propagation modes at a given point of the fiber under test by multiplying a vector of the Brillouin amplification components at the given point of the fiber under test by an inverse matrix of the gain coefficient matrix.

By acquiring a gain coefficient matrix in advance, using a reference optical fiber, in a state where only light in a specific mode is propagated, it is possible to calculate a true light intensity of light in each mode calculated from the light intensity measured for the actual test-target optical fiber, using the gain coefficient matrix. Therefore, the present invention can provide a light intensity distribution measurement method and a light intensity distribution measurement apparatus that are capable of accurately measuring the intensity of light in each mode at each position of an optical fiber through which light is propagated in a plurality of modes.

In addition, the light intensity distribution measurement method and apparatus according to the present invention further calculate the ratio between the light intensities of pump light in the propagation modes. By measuring the inter-mode ratio of the light intensities instead of measuring the absolute values of the light intensities in the respective modes, it is unnecessary to acquire the light intensity and interaction length of the probe light at the exit end of the optical fiber, which is difficult to measure.

Effects of the Invention

The present invention can provide a light intensity distribution measurement method and a light intensity distribution measurement apparatus that are capable of accurately measuring the intensity of light in each mode at each position of an optical fiber through which light is propagated in a plurality of modes.

DESCRIPTION OF EMBODIMENTS

The following describes an embodiment of the present invention with reference to the accompanying drawings. The embodiment described below is an example of the present invention, and the present invention is not limited to the embodiment described below. Note that components that are given the same reference numerals in the present description and the drawings indicate the same components.

A light intensity distribution measurement apparatus according to the present embodiment inputs pump light and probe light that have different frequencies from both ends of a measurement-target optical fiber, and measures a Brillouin gain generated as a result of the collision of light, for each propagation mode. By comparing the magnitudes of the Brillouin gains in the respective propagation modes, it is possible to calculate the light intensity in the fiber in the lengthwise direction thereof in terms of distribution.

Figure 1:
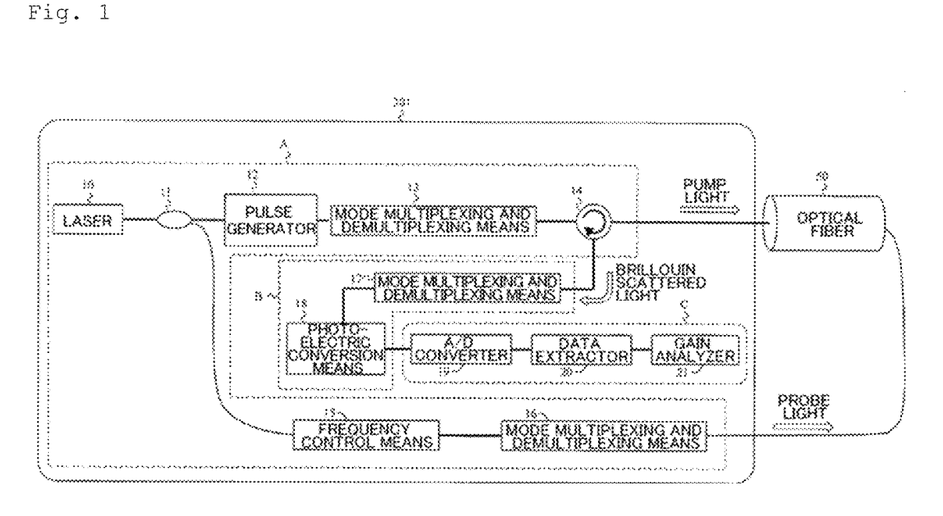
FIG. 1 is a block diagram illustrating a light intensity distribution measurement apparatus according to the present invention.

FIG. 1 is a diagram illustrating a light intensity distribution measurement apparatus 301 according to the present embodiment. The light intensity distribution measurement apparatus 301 includes a light input unit A, a light receiving unit B, and a control calculation unit C.

The light input unit A inputs pump light and probe light that have a given optical frequency difference, to an optical fiber 50, in all combinations of propagation modes.

The light receiving unit B measures the light intensity of the probe light in given one propagation mode propagated through the optical fiber 50.

The control calculation unit C controls the light input unit A and calculates the light intensity distribution of light in each of the propagation modes in the lengthwise direction of the optical fiber 50, based on the light intensity measured by the light receiving unit B.

First, a reference optical fiber that has the same number of propagation modes as the measurement-target optical fiber and that does not cause mode coupling is connected as the optical fiber 50.

The control calculation unit C:

causes the light input unit A to input pump light and probe light that have a given optical frequency difference, to the reference optical fiber, for each of combinations of the pump light in all of the propagation modes and the probe light in given one mode of the propagation modes;

acquires a Brillouin gain coefficient generated for the probe light, for each of the combinations of the propagation modes, based on the light intensity measured by the light receiving unit B; and varies the given optical frequency difference for each of the propagation modes, for the light input unit A, acquires Brillouin gain coefficients respectively corresponding to the propagation modes, while varying the given optical frequency difference for each of the propagation modes, based on the light intensity measured by the light receiving unit B, and generates a gain coefficient matrix of the Brillouin gain coefficients for the propagation modes and the optical frequency differences.

Thereafter, the measurement-target optical fiber is connected as the optical fiber 50.

The control calculation unit C:

inputs, to the light input unit A, pump light and probe light that have the optical frequency difference with which the gain coefficient matrix has been generated, to the measurement-target optical fiber, for the combinations of the propagation modes;

acquires, based on the light intensity measured by the light receiving unit B, Brillouin amplification components generated for the probe light, for each of the optical frequency differences and each of the combinations of the propagation modes, as distribution in a lengthwise direction of the measurement-target optical fiber; and calculating, based on the distribution, a light intensity of the pump light in each of the propagation modes at a given point of the measurement-target optical fiber by multiplying a vector of the Brillouin amplification components at the given point of the measurement-target optical fiber by an inverse matrix of the gain coefficient matrix.

The reference optical fiber is used to acquire the Brillouin gain coefficients in advance in a state where mode coupling has not been occurred. The reference optical fiber is an optical fiber that has the same number of propagation modes as the measurement-target optical fiber, and with which the same Brillouin gain spectrum (the frequency difference between pump light and probe light with which a gain is generated, and gain coefficients corresponding to the frequency difference) as the measurement-target optical fiber is generated between the modes (may also be referred to as "the same properties" in the following descriptions), but with which mode coupling does not occur. It is not invariably necessary that the reference optical fiber and the measurement-target optical fiber have the Brillouin gain spectrum. However, it is desirable to use an optical fiber that has a Brillouin gain spectrum similar to that of the measurement-target optical fiber as the reference optical fiber because such a difference may cause an error in the subsequent calculation processing. For example, it is possible to select, as the reference optical fiber, an optical fiber that has the same cutoff wavelength, the same number of propagation modes, the same mode field diameter for each mode, and the same propagation constant for each mode, as the measurement-target optical fiber.

Light output from a laser 10 that generates coherent light is branched into two rays by a branching element 11. One of the two branched light rays is pump light, which is pulsed by a pulse generator 12, is thereafter converted by a mode multiplexing and demultiplexing means 13 from a basic mode to a desired propagation mode, and is input to one end of the optical fiber 50.

The other of the two branched light rays is probe light, and an optical frequency controller 15 gives a frequency difference of approximately 10 to 11 GHz corresponding to the Brillouin frequency shift, relative to the optical frequency of the pump light. This optical frequency control means 15 may be controlled by an external modulator such as an SSB modulator constituted by $LiNb_3$. Alternatively, two lasers having different frequencies (wavelengths) may be used, one as a light source for pump light and the other as a light source for probe light, and the optical frequency difference between the two lasers may be controlled. The probe light to which the frequency difference has been added is converted by a mode multiplexing and demultiplexing means 16 into a desired propagation mode in the same manner as the pump light, and is input to the other end of the optical fiber 50. Note that, in the case of the configuration shown in FIG. 1, probe light is not necessarily pulsed.

In the optical fiber 50, a Brillouin gain is generated in the probe light as a result of the collision of the pump light and the probe light. The probe light amplified by the pump light is sent to a photoelectric conversion means 18 by an optical circulator 14. At that time, only the desired mode is selected by a mode multiplexer/demultiplexer 17. In the present embodiment, the amplified probe light LP01 is sent to the photoelectric conversion means 18. After the photoelectric conversion means 18 converts the probe light intensity into an electric signal and an A/D converter 19 converts the electric signal into digital data, a data extractor 20 and a gain analyzer 21 analyze the gain from this data.

With a specific method for Brillouin gain analysis, the reference intensity of the probe light when the pump light is not input is acquired. Thereafter, the signal intensity in the case where the pump light and the probe light are input is acquired. The Brillouin gain can be acquired by calculating the amount of increase in the reference intensity from the signal intensity. Through this measurement, by comparing the gain amount in the lengthwise direction of the measurement-target optical fiber, it is possible to acquire intensity information regarding the pump light at a given point (for this analysis method, see Non Patent Literature 2).

Figure 2:
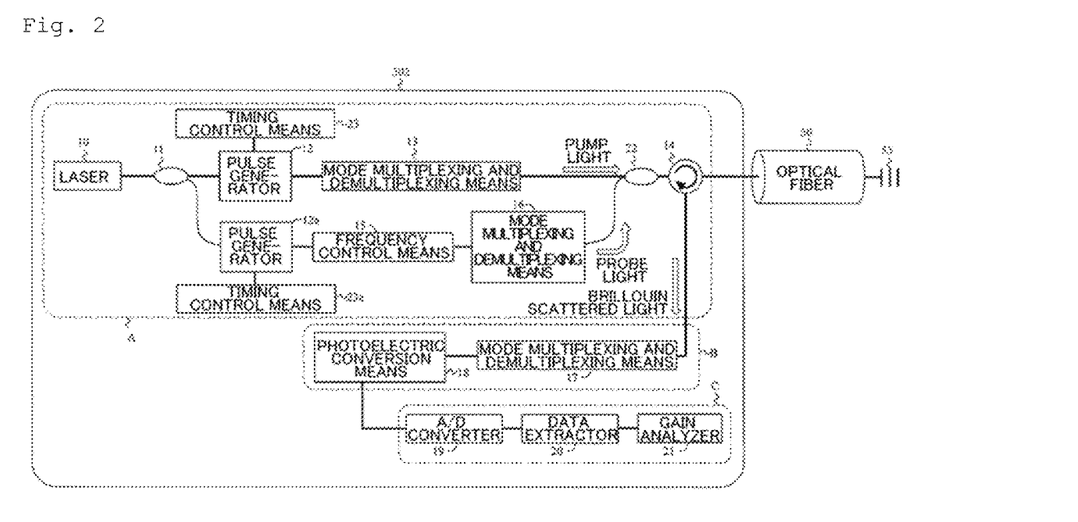
FIG. 2 is a block diagram illustrating the light intensity distribution measurement apparatus according to the present invention.

Note that the present embodiment can also be realized in a form in which pump light and probe light are input from one end of an optical fiber presented in Patent Literature 1. FIG. 2 is a diagram illustrating a light intensity distribution measurement apparatus 302 that inputs pump light and probe light from one end of an optical fiber. The light intensity distribution measurement apparatus 302 is different from the light intensity distribution measurement apparatus 301 shown in FIG. 1 in the following points.

Both of the two light rays branched from the laser 10 are subjected to pulsing timing control performed by timing control means (23, 23a) and pulsing means (12, 12a). The pulsed pump light and probe light are given a frequency difference by the optical frequency control means 15, are converted into a desired mode by the mode multiplexing and demultiplexing means (13, 16), and are thereafter multiplexed by a multiplexing element 22, and are input to one end of the optical fiber 50. A light reflector 55 is provided at the other end of the optical fiber 50, and each kind of pulsed light is reflected therefrom.

The time at which the pump light pulses and the probe light pulses are input to the optical fiber 50 are varied by the control of the timing control means (23, 23a). Therefore, the pulses reflected by the light reflector 55 and the unreflected pulses collide with each other in the measurement-target optical fiber, and a Brillouin gain is generated in the probe light.

The light returning from the optical fiber 50 is sent to the photoelectric converter 18 by the optical circulator 14. The subsequent analysis is performed through the same procedures as the procedures illustrated with reference to FIG. 1. With this configuration, the input timing difference between the pump light and the probe light corresponds to the gain generation point of the measurement-target optical fiber, and therefore it is possible to acquire intensity information regarding the pump light from the gain amount in the lengthwise direction.

The configurations shown in FIGS. 1 and 2 are examples, and if apparatus configurations are employed that can similarly give an optical frequency difference and an input time difference corresponding to a frequency (wavelength) shift between pump light and probe light, excite any propagation mode, and extract the amplified probe light in the time domain, any means may be employed. It is also possible to make the present scheme applicable to general SMF by shortening the wavelength of the input light pulses (making it shorter than the cutoff wavelength of SMF). Therefore, the optical fiber 50 suffices if a plurality of propagation modes are available.

Next, the details of the calculation performed by the control calculation unit C will be described.

When the frequency difference between pump light and probe light that maximizes the gain is referred to as a Brillouin frequency shift, the Brillouin frequency shift $v_b$ in any mode is given as

[Math. 1]

$$v_b = \frac{2n_i V_n}{\lambda} \quad (1)$$

where $n_i$ denotes the effective refractive index of the mode, $V_a$ denotes the effective velocity of the acoustic wave, and $\lambda$ denotes the wavelength in vacuum.

That is to say, in an optical fiber through which light in a plurality of modes propagates, the Brillouin frequency shift differs depending on the propagation mode. Therefore, the optical fiber through which light in a plurality of modes propagates has properties in which Brillouin spectrum information obtained at a given position in each mode has a peak for each mode.

For example, in a few-mode fiber through which light propagates in two modes, if pump light and probe light each have an amplitude in both $LP_{01}$ and $LP_{11}$ modes, there are the following three spectral peaks:

(i) v01-01 (an interaction between the pump and probe components in $LP_{01}$)

(ii) v01-11 (an interaction between the pump component in $LP_{01}$ and the probe component in $LP_{11}$, and an interaction between the pump component in $LP_{11}$ and the probe component in $LP_{01}$)

(iii) v11-11 (an interaction between the pump and probe components in $LP_{11}$).

By utilizing such properties, it is possible to control the optical frequency difference between the pump light and probe light input to the optical fiber to amplify any mode in the optical fiber.

On the other hand, the Brillouin gain spectrum generally has a line width of approximately 20 MHz, and therefore if $v_b$ in each mode is not separated from one another by at least 20 MHz, other mode components are also excited at the same time. Also, even if the respective spectra in the modes are separated from each other, if the gain coefficients of the modes are different from each other, the gain is large only in a specific mode, and it may be difficult to realize selective excitation even when the spectra are separated from each other by 20 MHz or more. Considering the above, it is difficult to acquire a gain that reflects pure power in each mode only by selecting a frequency and acquiring a gain.

To resolve this difficulty, the control calculation unit C acquires the intensity for each mode in the optical fiber through the following scheme.

[First Stage]—Acquire a Brillouin Gain Coefficient Matrix for Each Mode at Each Frequency.

In this stage, a reference optical fiber is connected to a light intensity distribution measurement apparatus.

An optical fiber in which light in a plurality of modes propagate is characterized in that the Brillouin frequency shift and the amount of gain differ depending on the combination of modes used. In order to utilize this feature, with the light intensity distribution measurement apparatus according to the present embodiment, a reference optical fiber that exhibits the same properties as the measurement-target optical fiber and does not cause mode coupling in the optical fiber is prepared in advance. Thereafter, the light intensity distribution measurement apparatus according to the present embodiment acquires, for each mode, a gain coefficient corresponding to the optical frequency difference between pump light and probe light in the reference optical fiber.

The gain coefficient is acquired through the following procedures: fix the mode of the input probe light in a state where the power of the pump light and the power of the probe light are fixed, change the mode of the input pump light, and acquire the Brillouin gain spectra at that time. That is to say, in the case of an optical fiber that propagates light in two modes, the spectra to be measured are the following two spectra:

(i) v01-01 (Interaction between the pump and probe components in $LP_{01}$) and (ii) v01-11 (an interaction between the pump component in $LP_{01}$ and the probe component in $LP_{11}$, and an interaction between the pump component in $LP_{11}$ and the probe component in $LP_{01}$).

Figure 3:
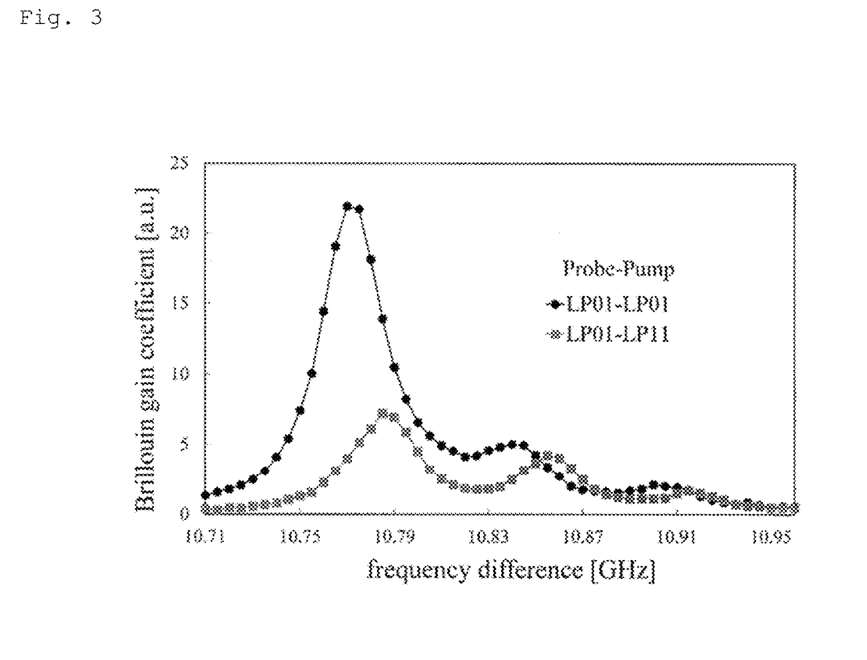
FIG. 3 is a diagram illustrating examples of Brillouin gain spectra acquired when a gain coefficient matrix is to be generated, using a light intensity distribution measurement method according to the present invention.

FIG. 3 is a diagram illustrating examples of Brillouin gain spectra in the case of a two-mode optical fiber. In FIG. 3, the horizontal axis indicates the optical frequency difference, and the vertical axis indicates the Brillouin gain coefficient. As can be seen from FIG. 3, the gain coefficient generated in each mode varies depending on the optical frequency difference between pump light and probe light. Here, a gain coefficient matrix $g_b$ for each mode of two different optical frequency differences in the two-mode optical fiber is

[Math. 2]

$$g_b = \begin{bmatrix} g_{01}(v_1) & g_{11}(v_1) \\ g_{01}(v_2) & g_{11}(v_2) \end{bmatrix} \quad (2)$$

where $g_{01}$ ($v_2$) and $g_{11}$ ($v_1$) are gain coefficients between $LP_{01}$ and $LP_{01}$ and between $LP_{01}$ and $LP_{11}$ when the optical frequency difference is $v_2$, respectively, and $g_{01}(v_2)$ and $g_{11}$ ($v_2$) are gain coefficients between $LP_{01}$ and $LP_{01}$ and between $LP_{01}$ and $LP_{11}$ when the optical frequency difference is $v_2$, respectively. The reference optical fiber does not cause mode coupling, and therefore there is no mode in which selective excitation is difficult in other than the case of the desired mode of pump light and probe light. Therefore, each element of the gain coefficient matrix $g_b$ is a pure gain coefficient generated between the desired modes.

When the gain amount is affected by the propagation loss of the pump light depending on the position in the reference optical fiber (when the reference optical fiber is long), the gain coefficient is obtained from the amount of gain generated near the pump light emission end (the end where the pump light is input). On the other hand, when the gain amount is not affected by the propagation loss of the pump light (when the reference optical fiber is short), the gain coefficient can be obtained from the gain amount of the entire reference optical fiber (an integral value in the z direction).

This gain coefficient matrix is acquired by selecting $v_1$ and $v_2$ from the gain spectrum in each mode such that $g_b$ is holomorphic, as shown in FIG. 3. Note that, in the present embodiment, the measurement-target optical fiber propagates light in two modes, and therefore there are two types of optical frequency differences that form the gain coefficient matrix $g_b$. However, if the measurement-target optical fiber propagates light in n modes (n is an integer greater than or equal to 3), n types of optical frequency differences are required in order to form the gain coefficient matrix $g_b$.

[Second Stage]—Measure the Light Intensity of Light in Each Mode on the Measurement-Target Optical Fiber.

In this stage, the measurement-target optical fiber is connected to the light intensity distribution measurement apparatus.

The intensities of the light in $LP_{01}$ and $LP_{11}$ in the measurement-target optical fiber are measured. The light intensity distribution measurement apparatus uses the $LP_{01}$ port of the mode multiplexer/demultiplexer 17 to receive the probe light subjected to Brillouin amplification, and receives only the $LP_{01}$ component.

The component amplified in the optical fiber through the Brillouin interaction can be acquired based on the difference between the amplified probe light (with pump light) and the probe light before amplification (without pump light). The component can be expressed using the product of the pump light intensity, the probe light intensity, and the gain coefficients (for details, see Non Patent Literature 2). Therefore, amplified components $P_{diff}(v_1,z)$ and $P_{diff}(v_2,z)$ that can be observed at a point z with optical frequency differences $v_1$ and $v_2$ can be expressed as

[Math. 3]

$$\begin{bmatrix} P_{diff}(v_1, z) \\ P_{diff}(v_2, z) \end{bmatrix} = P_{r01} \Delta L g_b \begin{bmatrix} P_{p01}(z) \\ P_{p11}(z) \end{bmatrix} \quad (3)$$

where $P_{r01}$ denotes the probe light intensity at the exit end of the optical fiber (the side to which the pump light is input in FIGS. 1 and 2), $\Delta L$ denotes the interaction length, and $P_{p01}(z)$ and $P_{p11}(z)$ denote the intensities of the pump light in $LP_{01}$ and $LP_{11}$ modes at the point z.

The gain coefficient matrix $g_b$ for each mode is acquired in the first stage and is holomorphic, and therefore, the formula (3) can be transformed as follows:

[Math. 4]

$$\begin{bmatrix} P_{p01}(z) \\ P_{p11}(z) \end{bmatrix} = \frac{1}{P_{r01} \Delta L} g_b^{-1} \begin{bmatrix} P_{diff}(v_1, z) \\ P_{diff}(v_2, z) \end{bmatrix} \quad (4)$$

That is to say, the light intensities $P_{p01}(z)$ and $P_{p11}(z)$ for each mode at the given position z of the measurement-target optical fiber can be calculated using $P_{r01}$, $\Delta L$, the component amplified through the Brillouin interaction, and $g_b$.

When measuring the true values of $P_{p01}(z)$ and $P_{p11}(z)$, it is necessary to acquire $P_{r01}$ and $\Delta L$. However, if only the ratio between $P_{p01}(z)$ and $P_{p11}(z)$ needs to be measured, it is unnecessary to acquire $P_{r01}$ or $\Delta L$.

If the ratio is acquired for $P_{p01}(z)$ and $P_{p11}(z)$ at each point (z and z+$\Delta$z, etc.), $P_{r01}$ and $\Delta L$ can be eliminated, and therefore the intensity distribution ratio for each mode in the lengthwise direction of the measurement-target optical fiber can be acquired.

For the sake of simplicity, the present embodiment describes the case of measuring the light intensity in each mode in a two-mode optical fiber. However, even in the case of an optical fiber through which a larger number of modes (n modes) propagates, if n×n gain coefficient matrices $g_b$ corresponding to the number of modes is acquired in the first stage, the light intensity in each mode can be calculated.

The measurement method performed by the light intensity distribution measurement apparatus according to the present embodiment is a light intensity distribution measurement method for measuring an intensity distribution of light in a plurality of propagation modes, in a lengthwise direction of a measurement-target optical fiber, the method including:

preparing a reference optical fiber that has the same number of propagation modes as the measurement-target optical fiber and that does not cause mode coupling;

inputting pump light and probe light that have a given optical frequency difference, to the reference optical fiber, for each of combinations of the pump light in all of the propagation modes and the probe light in given one mode of the propagation modes;

acquiring a Brillouin gain coefficient generated for the probe light, for each of the combinations of the propagation modes;

acquiring Brillouin gain coefficients respectively corresponding to the propagation modes, while varying the given optical frequency difference for each of the propagation modes, and generating a gain coefficient matrix of the Brillouin gain coefficients for the propagation modes and the optical frequency differences;

inputting pump light and probe light that have the optical frequency difference with which the gain coefficient matrix has been generated, to the measurement-target optical fiber, for the combinations of the propagation modes;

acquiring Brillouin amplification components generated for the probe light, for each of the optical frequency differences and each of the combinations of the propagation modes, as distribution in a lengthwise direction of the measurement-target optical fiber; and calculating, based on the distribution, a light intensity of the pump light in each of the propagation modes at a given point of the measurement-target optical fiber by multiplying a vector of the Brillouin amplification components at the given point of the measurement-target optical fiber by an inverse matrix of the gain coefficient matrix.

The measurement procedures according to the present method are summarized below.

[First Stage (Acquisition of Brillouin Gain Coefficients)]

1. Prepare a reference optical fiber that exhibits the same properties as a measurement-target optical fiber and that does not cause mode coupling.
2. Set an optical frequency difference between pump light and probe light.
3. Convert the modes of the pump light and the probe light.
4. Input the pump light and the probe light to the reference optical fiber.
5. Acquire gain coefficients that have been generated with the probe light.
6. Change the optical frequency difference and the combination of modes (change the propagation mode of the pump light without changing the propagation mode of the probe light), and repeat the procedures 2 to 5 to acquire the respective gain coefficients of the modes for the set optical frequency difference.

[Second Stage (Measurement of Intensity in Each Mode)]

1. Prepare a measurement-target optical fiber.
2. Set an optical frequency difference between pump light and probe light.
3. Set an input time difference between pump light and probe light.
4. Convert the modes of the pump light and the probe light
5. Input the pump light and the probe light to the measurement-target optical fiber.
6. Acquire a gain distribution that has been generated with the probe light.
7. Acquire the intensity distribution of light in each mode in the lengthwise direction of the measurement-target optical fiber, using the gain coefficients acquired in advance.

[Supplementary Notes] The following describes a light intensity distribution measurement apparatus according to the present embodiment.

The light intensity distribution measurement apparatus according to the present embodiment aims to estimate the intensities of pump light that propagates through an optical fiber in a plurality of modes, based on Brillouin gains, by utilizing the fact that the Brillouin gain are proportional to the light intensity of pump light. However, even when light in a desired mode is to be amplified, light in other modes may also be amplified. Therefore, the present light intensity distribution measurement apparatus estimates the pump light intensity in the desired mode in the following manner.

(1): A light intensity distribution measurement apparatus according to the present embodiment includes:

probe light generation means for inputting probe light to a measurement-target optical fiber;

pump light pulse generation means for giving an optical frequency difference to the probe light to acquire pulsed probe light;

frequency control means for controlling the optical frequency difference;

given-mode input means for inputting the probe light in a given propagation mode from one end of the measurement-target optical fiber;

given-mode input means for inputting the pump light pulse in a given propagation mode from the other end of the measurement-target optical fiber;

photoelectric conversion means for detecting an intensity of the probe light, converting the intensity to a photocurrent, and outputting the photocurrent;

data acquisition means for acquiring the photocurrent;

gain analysis means for analyzing an amplification gain of the probe light amplified with the pump light pulse; and gain separation means for separating the gain into intensities in the modes, to measure the intensity of light in each propagation mode.

(2): The light intensity distribution measurement apparatus according to (1) described above, wherein the optical frequency given by the frequency control means corresponds to a Brillouin frequency shift band between the input propagation mode of the probe light and the input propagation mode of the pump light pulse.

Effects

According to the present invention, by acquiring the Brillouin gain coefficient matrix for each mode at a given frequency in advance, it is possible to perform separation for each mode even when a gain in which a plurality of modes are mixed occurs in the optical fiber. As a result, it is possible to acquire the intensity of light in each mode for each optical fiber section.

REFERENCE SIGNS LIST

10 Laser
11 Branching element
12, 12a Pulse generator
13 Mode multiplexing and demultiplexing means
14 Optical circulator
15 Frequency control means
16 Mode multiplexing and demultiplexing means
17 Mode multiplexing and demultiplexing means
18 Photoelectric conversion means
19 A/D converter
20 Data extractor
21 Gain analyzer
22 Multiplexing element
23, 23a Timing control means
50 Optical fiber
51 Light Reflector
301, 302 Light intensity distribution measurement apparatus

The invention claimed is:

1. A light intensity distribution measurement method for measuring an intensity distribution of light in a plurality of propagation modes, in a lengthwise direction of a fiber under test, the method comprising:

preparing a reference optical fiber that has the same number of propagation modes as the fiber under test and that does not cause mode coupling;

inputting pump light and probe light that have a given optical frequency difference, to the reference optical fiber, for each of combinations of the pump light in all of the propagation modes and the probe light in given one mode of the propagation modes;

acquiring a Brillouin gain coefficient generated for the probe light, for each of the combinations of the propagation modes;

acquiring Brillouin gain coefficients respectively corresponding to the propagation modes, while varying the given optical frequency difference for each of the propagation modes;

generating a gain coefficient matrix of the Brillouin gain coefficients for the propagation modes and the optical frequency differences;

inputting pump light and probe light that have the optical frequency difference with which the gain coefficient matrix has been generated, to the fiber under test, for the combinations of the propagation modes;

acquiring Brillouin amplification components generated for the probe light, for each of the optical frequency differences and each of the combinations of the propagation modes, as distribution in a lengthwise direction of the fiber under test; and calculating, based on the distribution, a light intensity of the pump light in each of the propagation modes at a given point of the fiber under test by multiplying a vector of the Brillouin amplification components at the given point of the fiber under test by an inverse matrix of the gain coefficient matrix.

2. The light intensity distribution measurement method according to claim 1, further comprising:

calculating a ratio between light intensities of the pump light in the propagation modes.

3. A light intensity distribution measurement apparatus comprising:

a light input unit that inputs pump light and probe light that have a given optical frequency difference, to an optical fiber, in all combinations of propagation modes;

a light receiving unit that measures a light intensity of the probe light in given one propagation mode of the propagation modes propagated through the optical fiber; and a control calculation unit that controls the light input unit and calculates light intensity distribution of light in each of the propagation modes in a lengthwise direction of the fiber under test, based on the light intensity measured by the light receiving unit, wherein the control calculation unit:

causes the light input unit to input pump light and probe light that have a given optical frequency difference, to a reference optical fiber that has the same number of propagation modes as the fiber under test and that does not cause mode coupling, for each of combinations of the pump light in all of the propagation modes and the probe light in given one mode of the propagation modes;

acquires a Brillouin gain coefficient generated for the probe light, for each of the combinations of the propagation modes, based on the light intensity measured by the light receiving unit;

causes the light input unit to vary the given optical frequency difference for each of the propagation modes;

acquires Brillouin gain coefficients respectively corresponding to the propagation modes, while varying the given optical frequency difference for each of the propagation modes, based on the light intensity measured by the light receiving unit; and generates a gain coefficient matrix of the Brillouin gain coefficients for the propagation modes and the optical frequency differences, and the control calculation unit further:

causes the light input unit to input pump light and probe light that have the optical frequency difference with which the gain coefficient matrix has been generated, to the fiber under test, for the combinations of the propagation modes;

acquires, based on the light intensity measured by the light receiving unit, Brillouin amplification components generated for the probe light, for each of the optical frequency differences and each of the combinations of the propagation modes, as distribution in a lengthwise direction of the fiber under test; and calculates, based on the distribution, a light intensity of the pump light in each of the propagation modes at a given point of the fiber under test by multiplying a vector of the Brillouin amplification components at the given point of the fiber under test by an inverse matrix of the gain coefficient matrix.

4. The light intensity distribution measurement apparatus according to claim 3, wherein the control calculation unit further calculates a ratio between light intensities of the pump light in the propagation modes.

* * * * *